United States Patent [19]

McCamy

[11] Patent Number: 5,264,134
[45] Date of Patent: Nov. 23, 1993

[54] METHOD OF FILTERING POLLUTANTS FROM STORM WATER

[75] Inventor: Carter McCamy, Adamstown, Md.

[73] Assignee: Environmental Quality Resources, Inc., Silver Spring, Md.

[21] Appl. No.: 848,204

[22] Filed: Mar. 10, 1992

[51] Int. Cl.⁵ .............................................. C02F 1/28
[52] U.S. Cl. .................................. 210/679; 210/688; 210/691; 210/747; 210/484; 210/924
[58] Field of Search ............... 210/680, 688, 691, 693, 210/155, 162, 170, 172, 242.4, 282, 484, 924, 679, 747

[56] References Cited

U.S. PATENT DOCUMENTS 4,935,132  6/1990  Schaier .................................. 210/163
5,130,018  7/1992  Tolman et al. ........................ 210/172

Primary Examiner—Ivars Cintins
Attorney, Agent, or Firm—Spencer, Frank & Schneider

[57] ABSTRACT

A method is provided of removing hydrocarbon pollutants from a surface of a body of water in a storm water filtration system containing an oil separation chamber including a removable top cover to provide access to the chamber for removing oil, a side wall with a storm water inlet, another side wall with a filtered storm water outlet in a region of the chamber lower than the inlet and an overflow storm water outlet located above the filtered storm water outlet. A porous container having an interior filled with oleophilic and substantially buoyant material is located upon the surface of the water in the oil separation chamber so that oil floating on the surface of the storm water in the chamber is adsorbed by the oleophilic and substantially buoyant material. The porous container is tethered to a mount fixed to a wall of the chamber so that the porous container is prevented from clogging and passing through the overflow outlet and so that the porous container can be removed from the oil separation chamber after a period of use.

9 Claims, 4 Drawing Sheets

METHOD OF FILTERING POLLUTANTS FROM STORM WATER

BACKGROUND OF THE INVENTION

This invention is related to the field of water pollution and, more particularly, to a method for removing hydrocarbon pollutants and heavy metals from storm water filtration systems.

During a rainstorm, water runs off buildings, homes, sidewalks, lawns, streets, parking lots etc. of various land uses and flows into storm drains. These storm drains often conduct the storm water into a three chambered system called an oil-grit separator for removing grit (e.g. sediment, debris, etc.) and oil from the storm water. The filtered storm water may then be directed to streams or other waterways or if need be subjected to further processing.

The oil-grit separator is a filtration system made up of three concrete chambers through which the storm water must flow. The first chamber is for the removal of grit. As the storm waters flow into one side of the grit chamber, much of the sediment and debris that have been carried along sinks to the bottom of the chamber. An outlet passage is located around the middle of the opposing side of the grit chamber to permit the top portion of the storm water, absent much of the grit, to flow into a second chamber.

The second chamber is called an oil separation chamber. The storm waters flow into one side of the oil separation chamber forming a residual pool of water. On the opposing side of the chamber an L-shaped outlet passage dips below the surface level of the residual pool of water. As the storm waters join the residual pool of water in the chamber, oil washed from the streets, etc. floats to the top of the pool. The L-shaped outlet passage siphons off water below the surface of the residual pool to a third chamber and leaves the oil floating on the surface of the pool. For more severe flooding an overflow passage above the L-shaped outlet passage permits excess storm water to escape from the oil separation chamber to avoid a back-up in the system.

The third chamber allows the filtered storm water to flow on to area waterways.

Each chamber has a top access cover for cleaning and removing debris, sediment, oil and the like during routine maintenance of the oil-grit separation system. With regard to the removal of oil from the oil separation chamber, the process is both time consuming and expensive. The oil must be pumped from the chamber into a truck and removed for disposal.

Further, while statutes for regulating effluents into streams and waterways have become increasingly more stringent, budget cuts in many communities have extended the time between routine maintenance visits of these filtration systems. As a result, much of the oil in the chamber is often left for extended periods making removal and disposal of the liquid oil waste more time consuming and expensive. Also, an intervening heavy storm may push the oil in the oil separation chamber out of the overflow passage and into area waterways before routine maintenance can occur.

In addition, current oil-grit separator filtration systems have not addressed well the removal of toxic metal ions carried into the chambers by storm water effluent. These ions may also flow out of the three chambered filtration system to perhaps pollute downstream waterways.

SUMMARY OF THE INVENTION

It is an object of the present invention to provide a simple, low-cost means of removing hydrocarbon pollutants from the oil separation chamber of a storm water filtration system.

It is also an object of the invention to provide a means of retaining the oil in the oil separation chamber which has been collected but not yet removed.

It is a further object of the invention to provide an easily exchangeable means for recovering oil from the oil separation chamber.

It is a still further object of the invention to provide a means of removing toxic heavy metal ions from the oil separation chamber.

The above and other objects of the invention are accomplished in accordance with the invention by the provision of a method of removing hydrocarbon pollutants from a surface of a body of water in a storm water filtration system containing an oil separation chamber including a removable top cover to provide access to the chamber for removing oil, a side wall with a storm water inlet, another side wall with a filtered storm water outlet in a region of the chamber lower than the inlet and an overflow storm water outlet located above the filtered storm water outlet, the method comprising the steps of: locating a porous container having an interior filled with oleophilic and substantially buoyant material upon the surface of the body of water in the oil separation chamber so that oil floating on the surface of the water in the chamber is adsorbed by the oleophilic material; and tethering the porous container to a mount fixed to a wall of the chamber so that the porous container is prevented from clogging and passing through the overflow outlet and so that the porous container can be removed from the oil separation chamber after a period of use.

In one embodiment of the invention, the oleophilic material is contained in an open mesh bag which floats upon the surface of the storm water and is tethered to a side wall of the oil separation chamber.

In another embodiment of the invention, the oleophilic and substantially buoyant material is contained in a galvanized hardware cloth cage which floats upon the surface of the storm water and is tethered to a side wall of the oil separation chamber.

In a further aspect of the invention, a sponge material incorporating an amine-containing polymer having a selective affinity for toxic, heavy metals in cationic and anionic states in aqueous solution is placed in a weighted container to absorb heavy toxic metal ions in a lower region of the oil separation chamber. The weighted container is also tethered to a side wall in the chamber either directly or by way of the porous container with the oleophilic material.

The oil separation chamber has a removable top for easy removal of the saturated containers during routine maintenance.

BRIEF DESCRIPTION OF THE DRAWINGS

Further features of the invention can be found in the detailed description below taken in conjunction with the drawings, wherein.

DETAILED DESCRIPTION OF THE INVENTION

Figure 1:
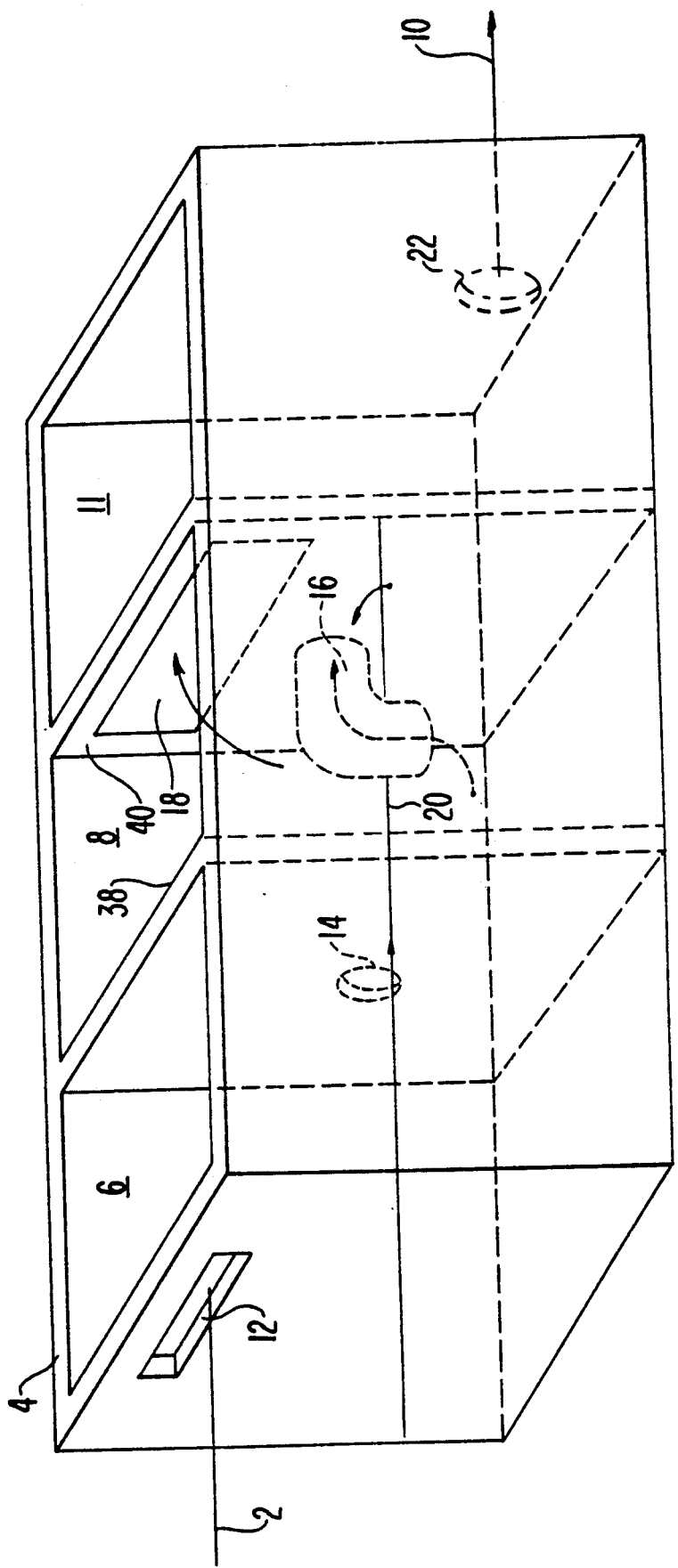
FIG. 1 shows a perspective view of a prior art method of separating oil and grit from storm water.

Referring now to the drawings, there is shown in FIG. 1 a typical oil-grit separator 4 comprising three chambers, namely a grit chamber 6, an oil separation chamber 8 and a clean water outlet chamber 11. Storm water 2 flows into grit chamber 6 through a grit chamber inlet 12 of oil-grit separator 4. A common oil/grit side wall 38 has a grit chamber outlet 14 which connects grit chamber 6 to oil separation chamber 8. A residual pool of water 20 is maintained at a level in grit chamber 6 and oil separation chamber 8 fixed by the level of grit chamber outlet 14. A common oil/clean side wall 40 has a filtered storm water outlet 16 to permit egress of filtered storm water into clean chamber 11. An overflow outlet 18 is also located on oil/clean side wall 40 above filtered storm water outlet 16. A clean chamber outlet 22 permits filtered storm water 10 to exit oil-grit separator 4.

Figure 2:
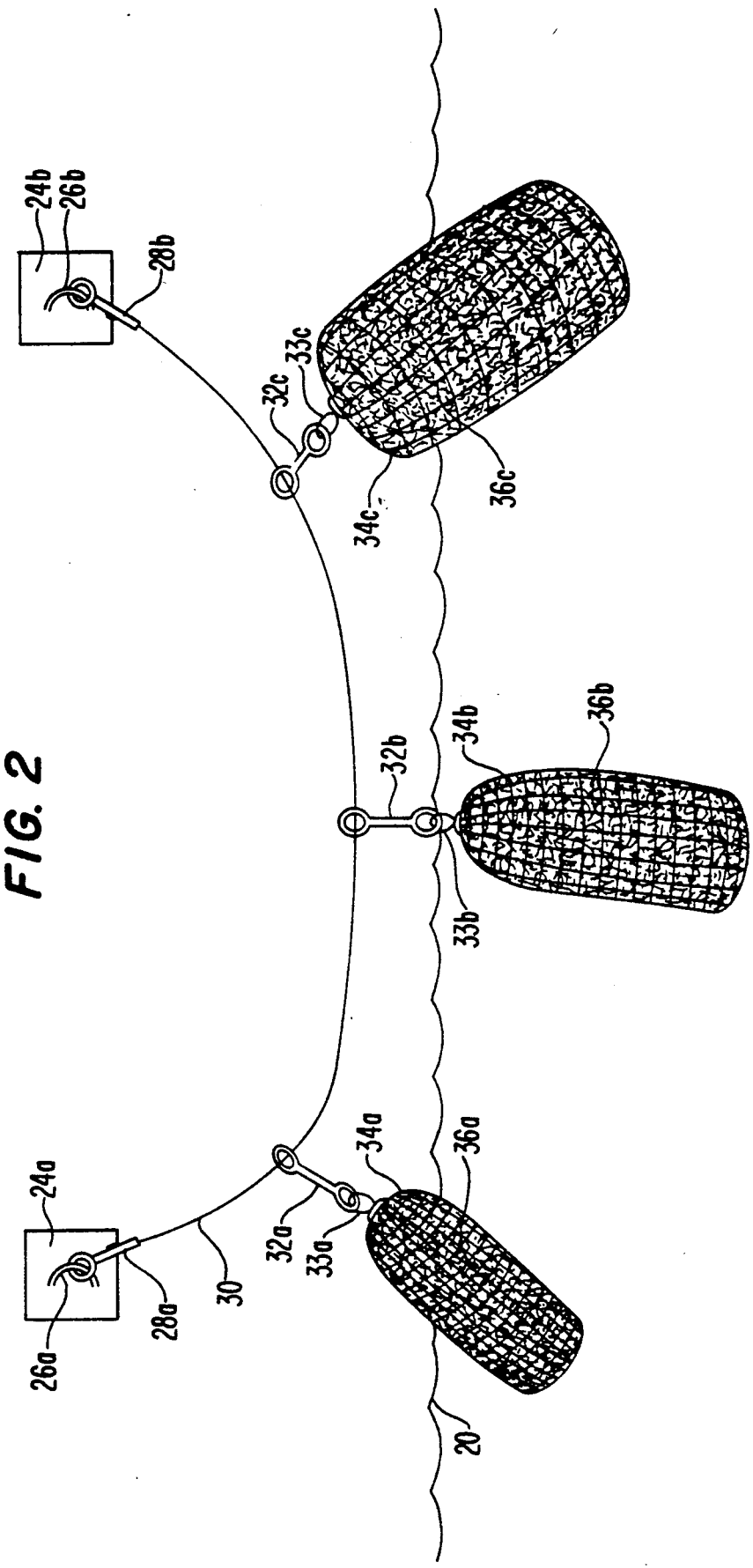
FIG. 2 shows a perspective view of oil adsorbing containers tethered to a wall of an oil separation chamber in accordance with one embodiment of the present invention.

FIG. 2 shows an embodiment of the invention in which a set of porous containers 34a, 34b and 34c in the form of open mesh bags filled with oleophilic and buoyant material is tethered to a side wall of oil separation chamber 8. For this purpose, a set of galvanized wall mounts 24a and 24b is flushed mounted to a side wall of oil separation chamber 8. A set of wall mount handles 26a and 26b are residually fastened to wall mounts 24a and 24b, respectively. A set of galvanized snap clips 28a and 28b are securely clipped onto wall mount handles 26a and 26b, respectively. A galvanized wire cord 30 is attached at one end to the non-clip ends of snap clips 28a and 28b. One end of dual clips 32a, 32b and 32c is clipped along wire cord 30. The other end of dual clips 32a, 32b and 32c is clipped onto eye hooks 33a, 33b and 33c of porous containers 34a, 34b and 34c, respectively, for tethering purposes.

Porous containers 34a-34c contain commercially available oleophilic and substantially buoyant material for adsorbing hydrocarbon pollutants 52 floating at or near the surface of residual pool 20. Oil sorbent material such as that made by Matarah Industries, Inc., Milwaukee, Wis., and traded under the name Matasorb, which adsorbs up to 20 times its weight in oil based liquids, may be used as the oleophilic material.

Porous containers 34a-34c are tethered tea bag style from dual snap clips 32a-32c in oil separation chamber 8 along marine grade galvanized wire cord 30. Wall mounts 24a and 24b are preferably mounted on a wall adjacent to oil/grit side wall 38 and oil/clean side wall 40. Some lateral or horizontal movement of porous containers 34a-34c is desirable to provide increased contact with the hydrocarbon pollutants floating upon the surface. However, motion should not permitted to the extent that either grit chamber outlet 14 or filtered storm water outlet 16 may be clogged by the possible positioning of the porous containers 34a-34c in oil separation chamber 8 by the action of storm water 2.

Figure 3:
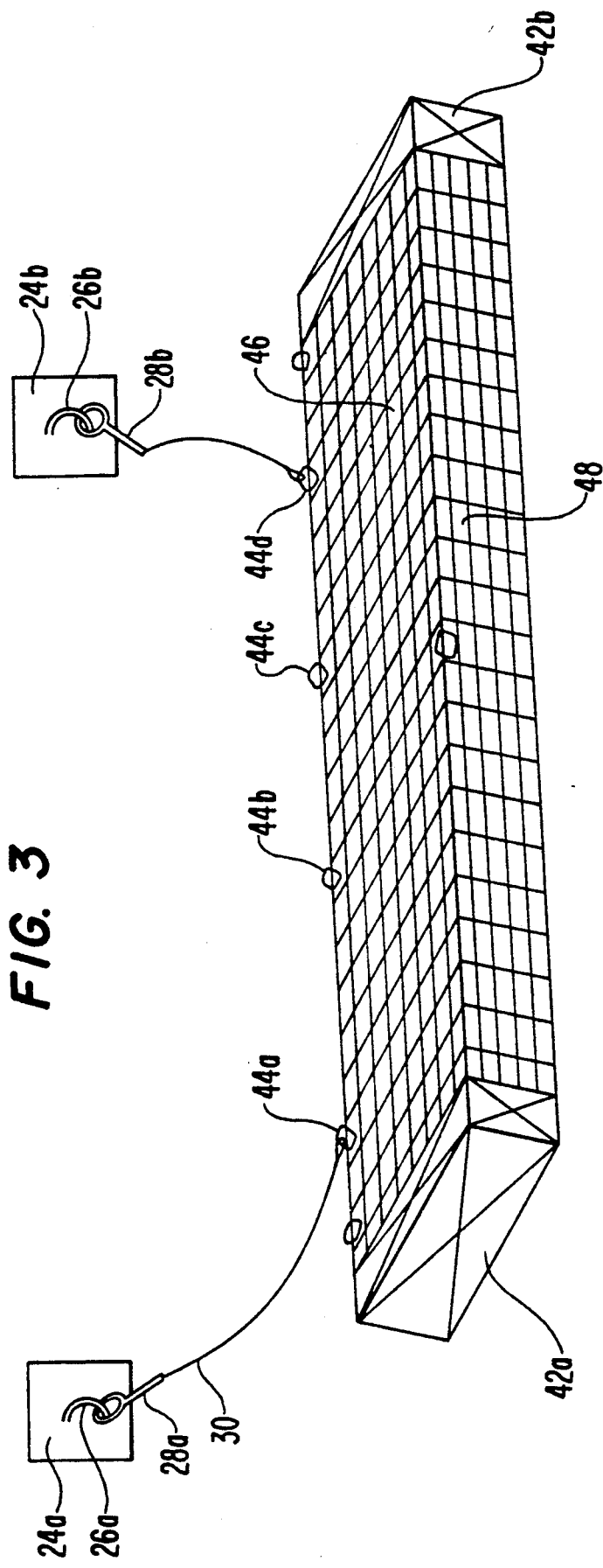
FIG. 3 shows a perspective view of a porous container in accordance with another embodiment of the invention.

FIG. 3 shows another embodiment of the invention in which like parts of FIG. 1 are given the same reference numerals. In FIG. 3, the porous container is in the form of a basket or cage 48 made of galvanized hardware cloth which encloses the oleophilic material by itself or as packaged in open mesh bags of the type shown in FIG. 2. Foam floats 42a and 42b are attached to opposite sides of cage 48 to augment the buoyancy of cage 48 so that it floats upon the surface of water in oil separation chamber 8. Cage 48 is provided with a number of cage loops 44a-44d through which galvanized wire cord 30 is passed for tethering the cage to a side wall of oil separation chamber 8 by way of snap clips 28a, 28b, wall mount handles 26a, 26b and wall mount 24a, 24b. Cage 48 has a hinged cage top 46 which is appropriately hinged so that it can be opened and closed for replacing the oil adsorbent material.

Figure 4:
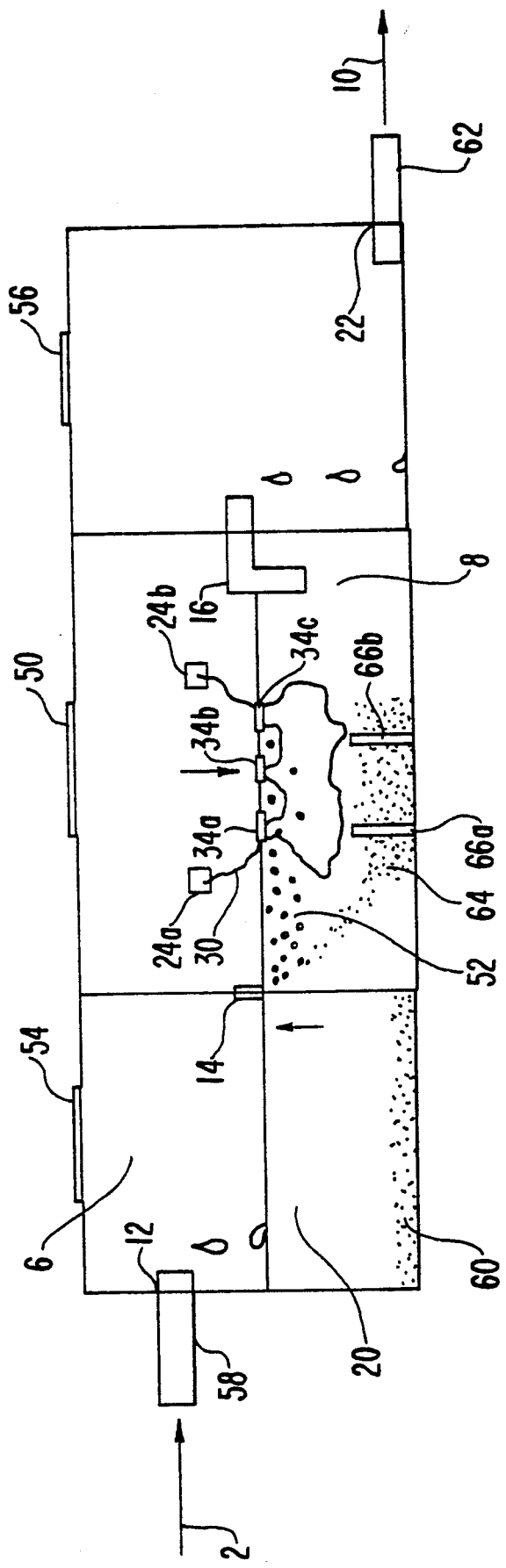
FIG. 4 shows a schematic sectional view of a storm water filtration system in accordance with a further aspect of the present invention.

Referring to FIG. 4, there is shown another aspect of the invention in which, in addition to the porous containers filled with oleophilic material such as shown in FIG. 2, one or more weighted porous containers 66a-66c filled with heavy metal ion selective material are provided for absorbing toxic heavy metal ions 64 dissolved in the storm water in a lower region of oil separation chamber 8. Porous containers 66a-66c are filled with a material which attracts heavy metal ions. Porous containers 66a-66c are weighted so as to sink to the bottom of oil separation chamber 8 for absorbing heavy metal ions in a lower region of the chamber. Material in each of weighted porous containers 66a-66c may incorporate an amine-containing polymer having a selective affinity for heavy metals in cationic and anionic states in aqueous solution (e.g. $Pb^{++}$, $Hg^{++}$, $Cu^{++}$, $Fe^{+++}$, $Mn^{++}$, $Zn^{++}$, $Ni^{++}$, $Au(CN)_2^-$, $SeO_4^{-2}$, $AsO_4^{-3}$, $CrO_4^{-2}$). A heavy metal ion absorbent material, for example that manufactured by Dynaphore, Inc., Richmond, Va., and traded under the name of Forager(TM) Sponge, may be used for this purpose.

The Forager(TM) Sponge contains between 4% and 20% (dry weight basis) of absorbed ions at saturation, depending upon the affinity of the polymer for the ion, and the molecular weight of the ion. This sponge is of the open-celled type for faster diffusion and absorption of ions.

Weighted porous containers 66a-66c may be tethered to a wall of oil separation chamber 8 directly, or as shown, by way of porous containers 34a-34c.

A grit chamber access cover 54 provides access into grit chamber 6 for removal of grit 60. Grit chamber outlet 14 in the middle region of oil/grit side wall 14 permits an upper region of storm water to flow into oil separation chamber 8. Oil separation chamber 8 has a removable top cover 50 to permit access therein for maintenance and inspection purposes. Filtered storm water outlet 16 permits filtered storm water to flow out of oil separation chamber 16 into clean chamber 11. A clean chamber access cover 56 permits entry into the clean chamber. Clean chamber outlet 22 permits filtered storm water 10 to flow into a filtered water conduit 62 and out of oil-grit separator 6.

In operation, storm water 2 carrying hydrocarbon pollutants, grit (such as sediment, debris and the like) and dissolved heavy metal ions from surface streets flows into grit chamber 6 of oil-grit separator 4 through inlet 12. As storm water 2 mixes with residual pool 20 grit 60 settles to the bottom surface of grit chamber 6 (FIG. 4). The increased water level in residual pool 20 allows storm water 2 at the surface of grit chamber 6 to flow through grit chamber outlet 14. Hydrocarbon pollutants 52 at the surface of storm water 2 and heavy metal ions 64 in aqueous solution flow through grit chamber outlet 14 into oil separation chamber 8.

After a period of use, top cover 50 of oil separation chamber 8 may be removed and the containers untethered and removed for replacement of the substantially saturated oleophilic material and the heavy metal ion attracting material substantially. Following removal of the saturated materials, containers filled with fresh material may be tethered and located in oil separation chamber 8 as replacements. Costly oil pumping operations during routine maintenance may thus be avoided.

Obviously, numerous and additional modifications and variations of the present invention are possible in light of the above teachings. It is therefore to be understood that within the scope of the appended claims, the invention may be practiced otherwise than as specifically claimed.

What is claimed is:

1. A method of removing hydrocarbon pollutants from a surface of a body of water in a storm water filtration system containing an oil separation chamber including a removable top cover to provide access to the chamber for removing oil, a side wall with a storm water inlet, another side wall with a filtered storm water outlet in a region of the chamber lower than the inlet and an overflow storm water outlet located above the filtered storm water outlet, said method comprising the steps of:

locating a porous container having an interior filled with oleophilic and substantially buoyant material upon the surface of the body of water in the oil separation chamber so that oil floating on the surface of the water in the chamber is adsorbed by the oleophilic and substantially buoyant material; and tethering the porous container to a mount fixed to a wall of the chamber so that the porous container is prevented from clogging and passing through the overflow outlet and so that the porous container can be removed from the oil separation chamber after a period of use.

2. The method of claim 1, and further comprising:
after the period of use of the container for adsorbing hydrocarbon pollutants, removing the cover of the oil separation chamber, untethering and removing the container; and
locating and tethering a fresh such container in the oil separation chamber.

3. The method of claim 1, wherein said locating step includes providing the porous container in the form of a bag filled with the oleophilic and substantially buoyant material, and providing the bag with an eye hook to which a cord can be connected for tethering the bag in the chamber.

4. The method of claim 1, wherein said locating step includes providing the porous container in the form of a wire cage filled with the oleophilic and substantially buoyant material.

5. The method of claim 1 further comprising the steps of:
locating at the bottom of the oil separation chamber a second porous container filled with a material which attracts heavy metal ions, said container being weighted so as to sink to the bottom of the oil separation chamber for absorbing heavy metal ions in a lower region of the chamber; and
tethering the second porous container to a wall of the oil separation container so that it can be removed from the top of the container after a period of use.

6. The method of claim 5, wherein said tethering step includes tethering the second porous container to a wall of the oil separation chamber by way of the first porous container.

7. The method of claim 5, wherein the material in the second porous container comprises a sponge incorporating an amine-containing polymer having selective affinity for heavy metals in cationic and anionic states in aqueous solution.

8. The method of claim 7, wherein said sponge is open-celled for faster diffusion and absorption of ions.

9. The method of claim 5, and further comprising:
after the period of use of the second container for absorbing heavy metal ions, removing the cover of the oil separation chamber, untethering and removing the second container; and
locating and tethering a fresh such second container in the oil separation chamber.

* * * * *